United States Patent
Yang et al.

(10) Patent No.: US 6,556,726 B2
(45) Date of Patent: *Apr. 29, 2003

(54) ELECTRIC OPTICAL FIBER GRATING FILTER WITH SWITCHABLE CENTRAL WAVELENGTH

(75) Inventors: Shu-Mei Yang, Taichung Hsien (TW); Chieh Hu, Taichung (TW); Ying-Ching Wang, Taipei Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 54 days.

This patent is subject to a terminal disclaimer.

(21) Appl. No.: 09/767,391

(22) Filed: Jan. 23, 2001

(65) Prior Publication Data

US 2002/0037125 A1 Mar. 28, 2002

(30) Foreign Application Priority Data

Aug. 7, 2000 (TW) .......................... 89115832A

(51) Int. Cl.$^7$ ............................................... G02F 1/035
(52) U.S. Cl. ...................... 385/2; 385/2; 385/6; 385/8; 385/15
(58) Field of Search ........................ 385/2, 4, 6, 8, 385/10, 15

(56) References Cited

U.S. PATENT DOCUMENTS

| | | | |
|---|---|---|---|
| 5,007,705 A | * 4/1991 | Morey et al. | .................. 385/12 |
| 5,042,898 A | * 8/1991 | Morey et al. | .................. 385/37 |
| 5,450,276 A | * 9/1995 | Olifant et al. | ............... 361/152 |
| 5,469,520 A | 11/1995 | Morey | ......................... 389/37 |
| 5,694,503 A | 12/1997 | Fleming | ..................... 369/103 |
| 5,812,711 A | 9/1998 | Glass | .......................... 389/37 |
| 5,829,431 A | * 11/1998 | Hannah et al. | ......... 128/201.19 |
| 5,841,920 A | * 11/1998 | Lemaire et al. | ............... 385/37 |
| 5,999,671 A | * 12/1999 | Jin et al. | ...................... 385/13 |
| 6,108,470 A | * 8/2000 | Jin et al. | ...................... 385/24 |
| 6,148,128 A | * 11/2000 | Jin et al. | ..................... 359/130 |
| 6,356,683 B1 | * 3/2002 | Hu et al. | ..................... 359/161 |
| 6,366,721 B1 | * 4/2002 | Hu et al. | ...................... 385/37 |
| 6,370,310 B1 | * 4/2002 | Jin et al. | ..................... 385/136 |

FOREIGN PATENT DOCUMENTS

| | | | |
|---|---|---|---|
| EP | 0 867 736 A2 | 9/1998 | ............ G02B/6/16 |
| WO | WO 98/27446 | 6/1998 | |

* cited by examiner

*Primary Examiner*—Frank G. Font
*Assistant Examiner*—Kevin C Kianni
(74) *Attorney, Agent, or Firm*—J.C. Patents

(57) ABSTRACT

An electric optical fiber grating has a central wavelength. The central wavelength of an optical fiber grating can be adjusted under strain. The filter includes a bimetal plate, an elastic structure and an solenoid to achieve the goal of switching the central wavelength of an optical fiber grating. Meanwhile, the bimetal plate can also provide proper passive compensation according to the temperature effect around them so that it is not necessary for the optical fiber grating that can switch central wavelengths, to monitor and conduct feedback control at all times. Thus it does not consume power. Therefore, the electric optical fiber grating filter can both achieve the goal of switching central wavelengths and has the advantage of not being sensitive to temperature.

8 Claims, 5 Drawing Sheets

ELECTRIC OPTICAL FIBER GRATING FILTER WITH SWITCHABLE CENTRAL WAVELENGTH

CROSS-REFERENCE TO RELATED APPLICATION

This application claims the priority benefit of Taiwan application Ser. No. 89115832, filed Aug. 7, 2000.

BACKGROUD OF THE INVENTION

1. Field of the Invention

The present invention relates to an optical fiber grating. More particularly the present invention relates to an electric optical fiber grating that can switch central wavelength.

2. Description of the Related Art

With the development of high-density wavelength multiplex optical transmission technology, it is very important to add or to drop in required signal wavelengths at certain junctions. In order to increase the adaptability of transmission capacity, it is very important to design for wavelength restructuring.

A Bragg optical fiber grating provides a fiber with periodic variance of refractive index at the core of the fiber. This phenomenon can be achieved by irradiating an interference pattern on the optical fiber. The interference pattern can be obtained by causing the interference between two ultra-violet rays or directly causing interference on the ultra-violet ray through a mask. Due to the optical sensitivity of the optical fiber, the refractive index periodically varies.

After light beam is incident into an optical fiber grating, only if a wavelength of the incident light satisfies the Bragg's condition, where the wavelength equal to the central wavelength of the optical fiber grating, the incident light with the specific wavelength can be reflected. The central wavelength of the reflection of the optical fiber grating is equal to a quantity of two times of arithmetic product of the equivalent refraction index and the spacing of refraction changes. The other incident light with wavelengths without satisfying the Bragg's condition are not reflected and they all pass the optical fiber grating.

When the temperature exerting on the optical fiber grating has changed, the temperature effect would cause a shift on the central wavelength of the optical fiber grating. When a wavelength of 1550 nm is operated on, the wavelength temperature coefficient is approximately 0.012 nm/° C. That is, when temperature changes 1° C., the central wavelength of an optical fiber grating changes 0.012 nm.

In addition, when the stress applied to the optical fiber grating due to external changes, the change of the stress also affects the equivalent refraction index and refraction spacing length, and causes shifting of the central wavelength of the optical fiber grating. When a wavelength of 1550 nm is operated on, the wavelength strain coefficient is approximately 1.2 nm/millistrain.

Owing to the two characteristics described above, there are different considerations in the application of optical fiber grating. For example, a technology disclosed by US patent (U.S. Pat. No. 5,694,503) fixes the optical fiber grating on a ceramic substrate with a negative temperature thermal expansion coefficient. Other examples, such as the technologies disclosed by U.S. patent (U.S. Pat. No. 5,841,920) and World Intelligence Property Organization patent (WO9827446), uses a structure formed by two components with very different thermal expansion coefficients to produce a negative temperature thermal expansion effect. The above technologies are all applied to fixed wavelengths. They use a ceramic substrate with a negative temperature thermal expansion coefficient or a structure formed by two components with very different thermal expansion coefficients to produce stress to compensate for the shifting of the central wavelength of an optical fiber grating caused by the change of temperature. In this way, the shifting of the central wavelength of an optical fiber grating produced when temperature changes, is reduced, which has an equivalent effect on the reduction of the wavelength temperature coefficient.

In the application of adjusting central wavelengths of an optical fiber grating, a technology that is disclosed by U.S. patent (U.S. Pat. No. 5,812,711) is directed to adjusting the wavelength of an optical fiber grating by way of magnetic strain. Another technology that is disclosed by U.S. patent (U.S. Pat. No. 5,469,520) is directed to adjusting the wavelength of an optical fiber grating by way of compression strain. In addition, a technology that is disclosed by European patent (EP0867736) is directed to adjusting the wavelength of an optical fiber grating by way of heating.

With an increase of the wavelength multiplex channels, the space length between channels has gradually reduced from 1.6 nm to 0.4 nm. The accuracy of the corresponding central wavelength also needs to reach ±0.025 nm. If the temperature control is adopted as a way to adjust wavelength, it requires long-term power consumption. Adjusting wavelength by way of piezoelectric material (e.g. $PbZrTiO_3$, PZT) strain also requires long-term power consumption. While magnetic strain only requires power consumption during wavelength adjustment, it still requires consideration of the wavelength temperature coefficient of the optical fiber grating and on the thermal expansion coefficient of the magnetic material itself. As to the adjustment by way of optical fiber vertical strain, the accuracy of the adjustment needs to reach the resolution of several micrometers, therefore it requires great accuracy of position during fabrication.

Up to now, the above structures for adjusting central wavelength did not take into consideration the effect of temperature on wavelength shifting. That is, after these optical fiber gratings are adjusted to certain wavelengths, the situation of central wavelength shifting occurs due to the influence of temperature.

Therefore the present invention provides an electric optical fiber grating filter that can switch central wavelength, which uses a bimetal plate, an elastic structure, and an solenoid to form an optical fiber grating that can switch central wavelength and prevent the central wavelength from shifting.

The present invention provides an electric optical fiber grating filter that can switch central wavelength. The grating does not need to monitor the temperature and feedback control at all times. Therefore, it does not consume power. At the same time, it can adjust wavelength and has the advantage of not being sensitive to temperature.

An electric optical fiber grating filter that can switch central wavelength comprises at least a bimetal plate, an optical fiber, a spring, a screw, a mobile structure, and an solenoid. The bimetal plate includes a first metal plate and a second metal plate joined together, and the thermal expansion coefficient of the first metal plate is smaller than that of the second metal plate. An optical fiber grating is provided in the optical fiber. The optical fiber is fixed along the surface of the first metal plate. Because of the difference in the thermal expansion coefficients of the first metal plate and the second metal plate, the bimetal plate bends when temperature changes, causing change of the central wavelength of the optical fiber grating. The change in the wavelength can be used to compensate for the shifting of the wavelength of the optical fiber grating caused by the change of temperature. A first end of the spring is connected to the second metal plate. The screw is connected to a second end of the spring to adjust the number of spring coils and to optimize the compensation for the shifting of the central wavelength of the optical fiber grating caused by the change in temperature. The screw is installed on the mobile structure and the solenoid is connected to the mobile structure to stretch the spring to a first position or to compress the spring to a second position so as to cause the bimetal plate to produce the bending changes. In this way, the central wavelength of the optical fiber grating can switch between two predetermined values.

Another electric optical fiber grating filter that can switch central wavelength is provided by the present invention. The filter comprises at least a bimetal plate, an optical fiber, an elastic structure, a mobile structure and an solenoid. The pair of metal plates include a first metal plate and a second metal plate joined together, and the thermal expansion coefficient of the first metal plate is smaller than that of the second metal plate. An optical fiber grating is provided in the optical fiber. The optical fiber is fixed along the surface of the first metal plate. Because of the difference in the thermal expansion coefficients of the first metal plate and the second metal plate, the bimetal plate bend when temperature changes, and thus cause the central wavelength of the optical fiber grating to change. The change in the wavelength can be used to compensate for the shifting of the wavelength of the optical fiber grating caused by the change in temperature. A first end of the elastic structure is connected to the second metal plate. A second end of the elastic structure is installed on the mobile structure. An solenoid is connected to the mobile structure to stretch the elastic structure to a first position or to compress it to a second position so as to cause the bimetal plate to produce the bending changes. In this way, the central wavelength of the optical fiber grating can switch between two predetermined values.

The present invention provides a method for switching the central wavelength of an electric optical fiber grating filter that can switch central wavelength. The above described optical fiber grating filter includes a bimetal plate, an optical fiber, which is provided with an optical fiber grating and is fixed along the surface of the bimetal plate, an elastic structure, one end of which is connected to the bimetal plate, and an solenoid, which is connected to the other end of the elastic structure. The above described method includes at least: using the solenoid to stretch the elastic structure to a first position or compress it to a second position so as to cause the bimetal plate to bend. In this way the central wavelength of an optical fiber grating can be switched.

DESCRIPTION OF THE DRAWINGS

The accompanying drawings are included to provide a further understanding of the above described objects, characteristics, and advantages of the invention. The drawings illustrate a preferred embodiment of the invention and, together with the description, serve to explain the principles of the invention. In the drawings.

DESCRIPTION OF PREFERRED EMBODIMENT

Figure 1:
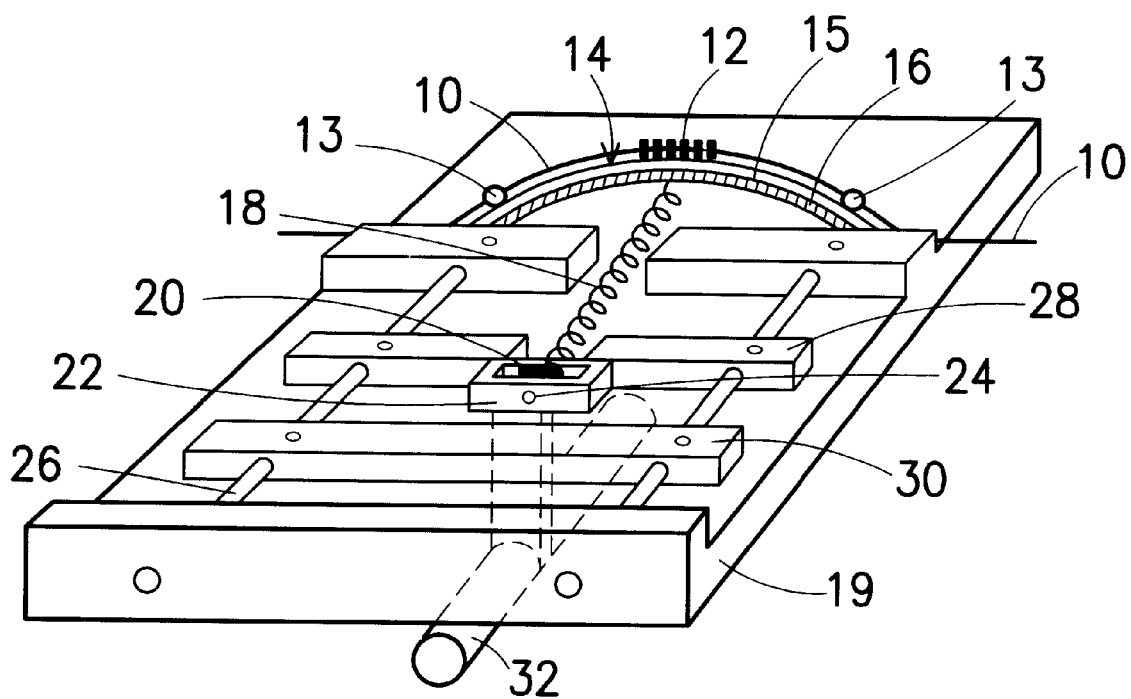
FIG. 1 is a schematic drawing of an electric optical fiber grating filter that can switch central wavelength according to the preferred embodiment of the present invention.
Figure 1:
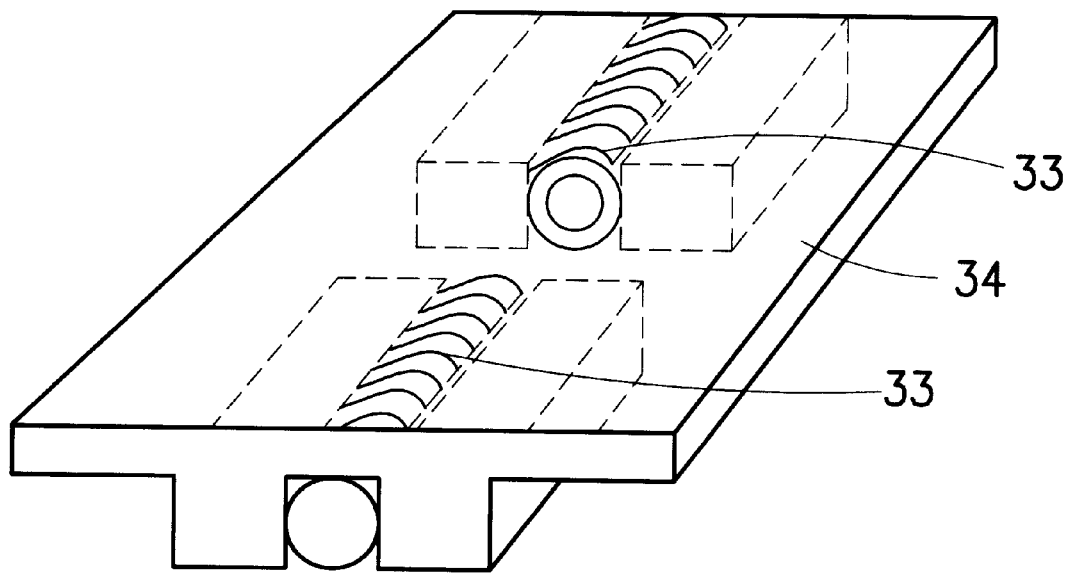
Figure 2:
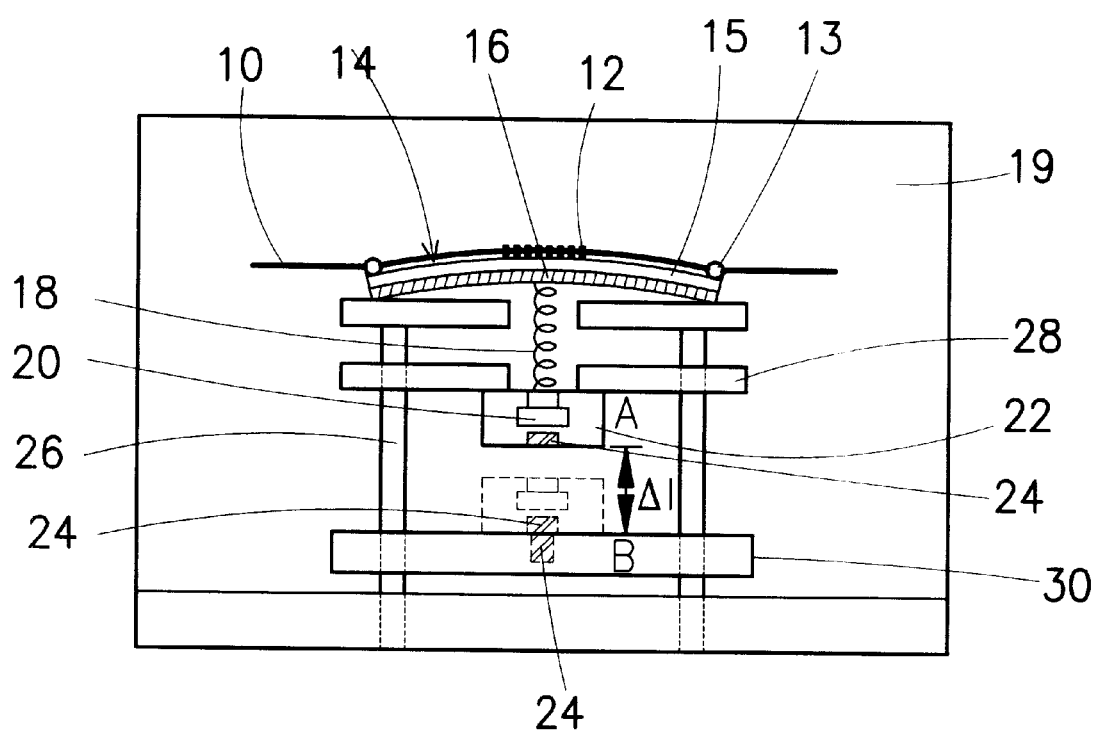
FIG. 2 is a top view of the optical fiber grating filter as shown in FIG. 1.

FIG. 1 shows the electric optical fiber grating filter that can switch central wavelength according to the first preferred embodiment of the present invention. The electric optical fiber grating filter that can switch central wavelength according to the present invention comprises at least an optical fiber 10, an optical fiber grating 12, a bimetal plate 14, an elastic structure (for example: a spring) 18, a mobile structure 22, and an electromagnetic switch (including an iron plunger 32 and two solenoid 33). The bimetal plate 14 is composed of a first metal plate 15 and a second metal plate 16 joined together, wherein the thermal expansion coefficient of the first metal plate 15 is smaller than that of the second metal plate 16. The optical fiber grating is located in the optical fiber 10, and the optical fiber 10 is fixed along the surface of the first metal plate 15. A first end of the spring 18 is connected to the second metal plate 16. The screw 20 is connected to a second end of the spring 18, and is installed on the mobile structure 22. In addition, the numeral references for the other elements are: optical fiber glue fixing point 13, upper sub base 19, magnet 24, guide trail 26, upper baffle 28, lower baffle 30, lower sub base 34. The plunger 32 of the above-described solenoid is indirectly connected to the screw 20 through mobile structure 22. FIG. 2 is a top view of the electric optical fiber filter that can switch central wavelength as shown in FIG. 1, wherein the $\Delta L$ represents the moving distance of the mobile structure.

The optical fiber 10 is used to receive incident light and limit the incident light for travelling in the optical fiber 10. The optical fiber grating 12 in the optical fiber 10 reflects the incident light signals with wavelength equal to the central wavelength, while the incident light signals with wavelength other than the central wavelength do transmit through. In addition, the optical fiber 12 is fixed on the surface of the bimetal plate 14 so that when an external force or a change in temperature cause the bimetal plate 14 to be bent and deformed, they cause the optical fiber grating 12 to be stretched, so as to change the central wavelength of the optical fiber grating.

The bimetal plate have two main functions:

(1) The thermal expansion coefficient of the first metal plate 15 is smaller than that of the second metal plate 16. When temperature changes, the bimetal plate 14 bend towards the first metal plate 15 because the amount of the thermal expansion of the first metal plate 15 and the second metal plate 16 are different and the two metal plates 15 and 16 are joined together. The degree of curvature is directly proportional to the squared length of the bimetal plate 14 and the temperature, and it is in inverse proportion to the thickness of the bimetal plate 14. By making use of the expansion bending effect, the goal of compensating negative variance on temperature of the optical fiber grating 12 can be achieved. In other words, the displacement amount of the central wavelength of the optical fiber grating 12 caused by the change of the temperature can be compensated.

(2) Since the central wavelength of the optical fiber grating 12 would changes of when the optical fiber 10 is under a stress, it is possible to utilize external force to stretch and compress the spring 18 in order to cause the bimetal plate 14 to be bent and deformed. As a result, the central wavelength of the optical fiber grating 12 can be switched to the predetermined value. Using principles of structure mechanics, the relation between the bimetal plate 14 and the spring 18 can be derived. The relation between strain, temperature variance, and the moving distance of the mobile structure can be presented by the following equation:

$$\Delta\epsilon = \gamma \Delta L + \beta \Delta T, \quad (1)$$

where $$\gamma = -\frac{8yLk}{L^3k + 4Ebt^3}, \quad \beta = -\frac{8yaEbt^2}{L^3k + 4Ebt^3},$$

$\Delta\epsilon$: the surface strain quantity of the bimetal plate;
$\Delta L$: the moving distance of the mobile structure;
$\Delta T$: the external temperature difference;
y: the distance between the neutral plane and the surface of the bimetal plate;
a: deflection constant of the bimetal plate;
b: with of the bimetal plate;
t: thickness of the bimetal plate;
L: length of the bimetal plate;
E: the elastic modulus of metal plates; and
k: the elastic modulus of compression spring.

It can be seen from equation (1) that the negative thermal expansion property of the bimetal plate 14 is reduced when the spring 18 is added. Therefore, a properly chosen combination of the bimetal plate 14 and the spring 18 can achieve the effect of passive temperature compensation for the optical fiber grating 12.

In addition, the relation between the central wavelength $\lambda_B$, wavelength shifting amount $\Delta\lambda_B$, temperature change, and the moving distance of the mobile structure can be expressed by the following equation:

$$\frac{\Delta\lambda_B}{\lambda_B} = \gamma(1 - P_e)\Delta L + [\beta(1 - P_e) + (a + \xi)]\Delta T, \quad (2)$$

where
Pe: photo-elastic constant;
ξ: thermo-optic coefficient; and
a: thermal-expansion coefficient.

It can be seen from equation (2), when $$\beta = -\frac{(a + \beta)}{(1 - P_e)}, \quad \frac{\Delta\lambda_B}{\lambda_B} = a(1 - P_e)\Delta L.$$

It is independent to temperature change $\Delta T$. Thus, compensation for the shifting of the central wavelength of the optical fiber grating 12 caused by temperature change is optimized. In the electric optical fiber grating filter with capability of switching the central wavelength according to the present invention, the screw 20 can be used adjust to have the desired number of windings of the spring 18. In this manner, the elastic modulus k of the spring 18 can be adjusted to reach $$\beta = -\frac{(a + \beta)}{(1 - P_e)},$$

so that compensation for the shifting of the central wavelength of the optical fiber grating 12 caused by temperature change is optimized. Under ideal circumstances, $$\frac{\Delta\lambda_B}{\lambda_B}$$

has relation with $\Delta L$, but has no relation with $\Delta T$.

Figure 3:
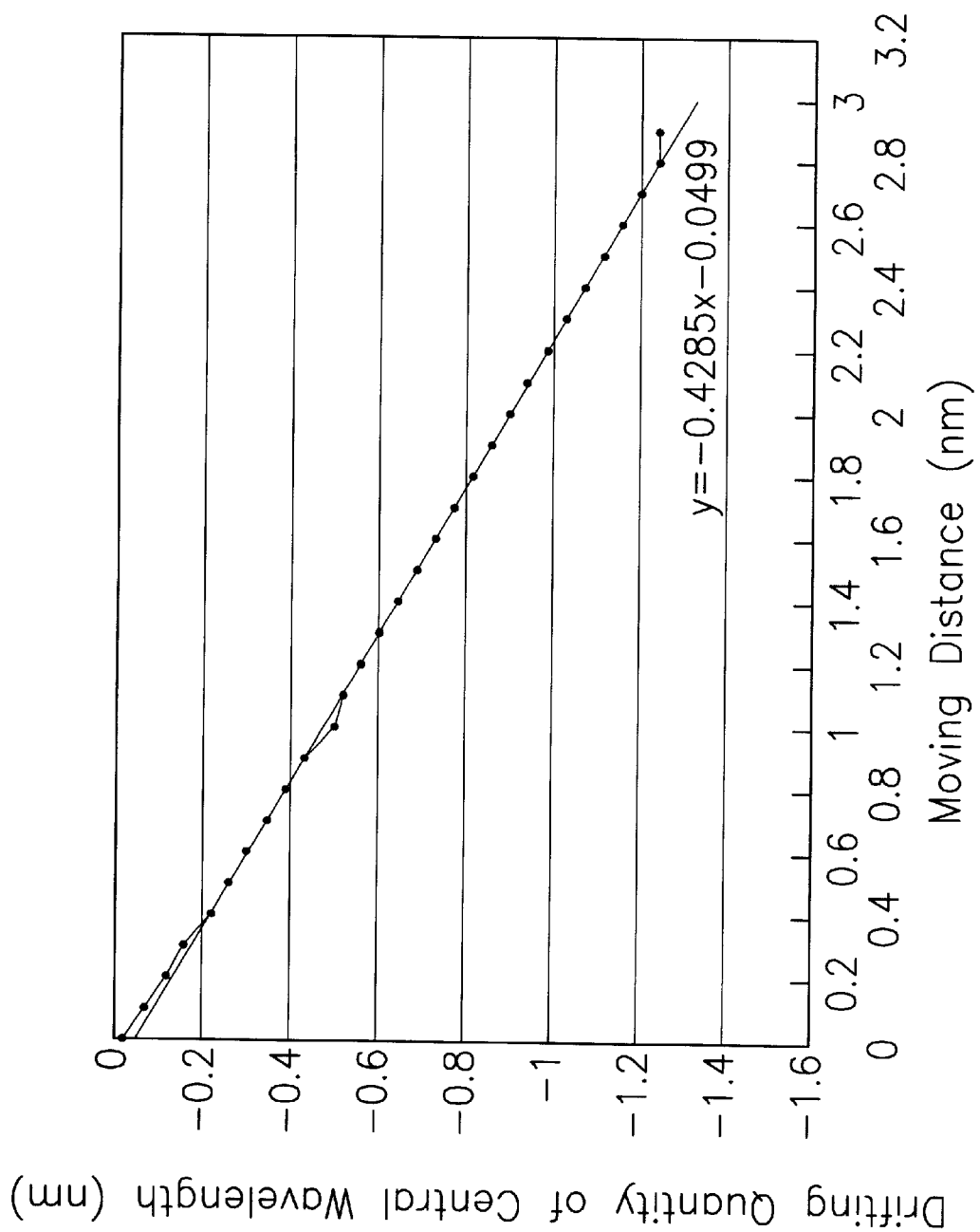
FIG. 3 is a drawing schematically showing the relation between the moving distance of the mobile structure of the optical fiber grating filter and the change in the central wavelength according to the preferred embodiment of the present invention.
Figure 4:
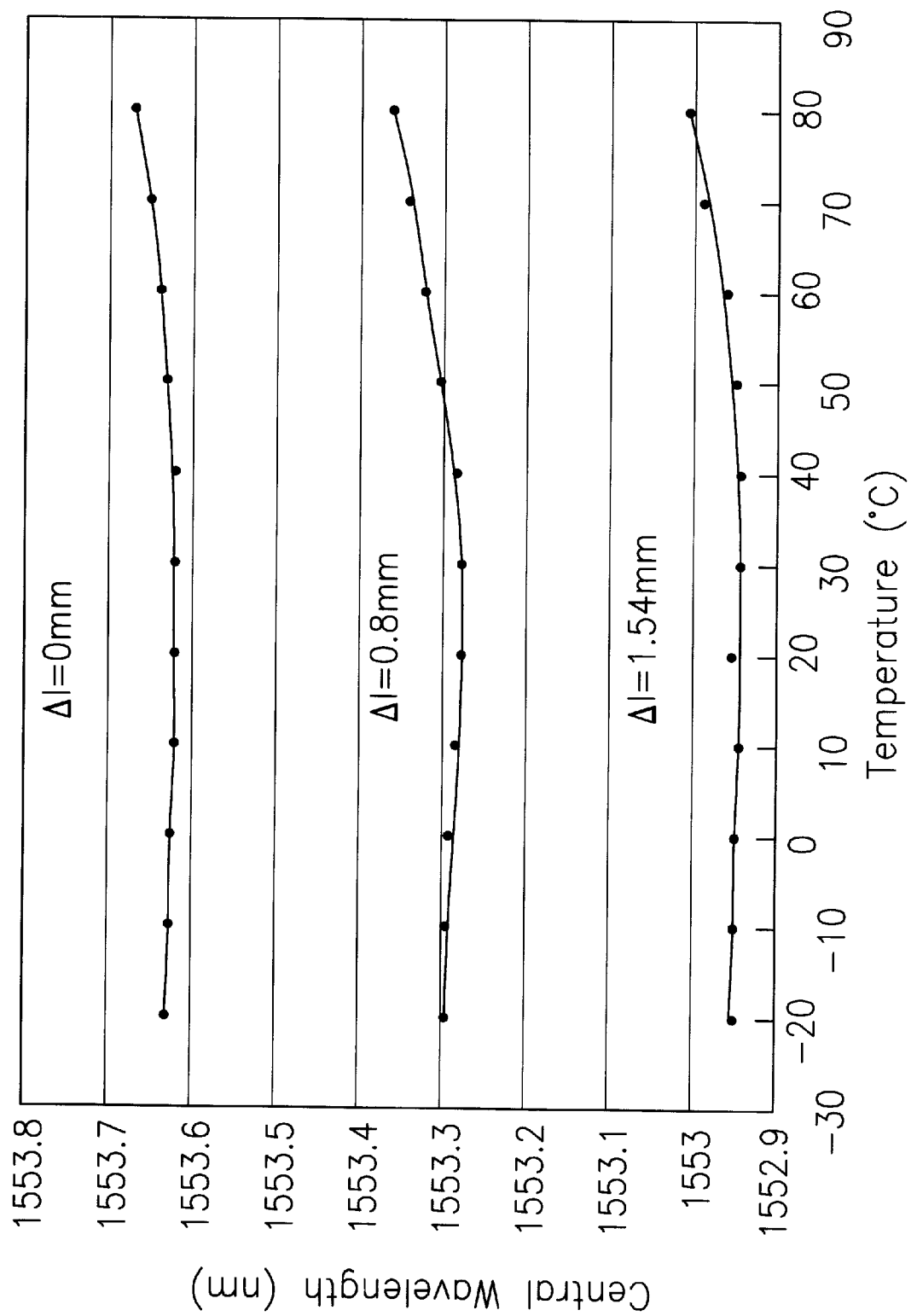
FIG. 4 is a drawing schematically showing the relation between temperature and wavelength according to the preferred embodiment of the present invention, wherein the amount of movement of the mobile structure is $\Delta L=0$, 0.8, 1.54 mm.

The moving distance $\Delta L$ of the above-described mobile structure 22 can be fulfilled through the foregoing solenoid (comprising: a plunger 32 and a solenoid 33). In other words, when the foregoing solenoid is operated, it can cause the mobile structure 22 to move. At this moment, the spring 18 produces action on the bimetal plate 14, cause them to be bent so as to change the central wavelength of the optical fiber grating 12. FIG. 3 is a drawing, schematically showing the relation between the amount of shifting of the central wavelength of the optical fiber grating 12 and the moving distance of the mobile structure. As shown in FIG. 3, the relation between the shifting quantity of the central wavelength and the moving distance of the mobile structure is a linear relation. FIG. 4 is a drawing, schematically showing the relation between temperature and central wavelength of the electric optical fiber grating filter that can switch wavelength according the present invention. Wherein $\Delta L$=0, 0.8 mm, 1.54 mm, the temperature coefficient is smaller than 0.001 nm/° C.

Figure 5:
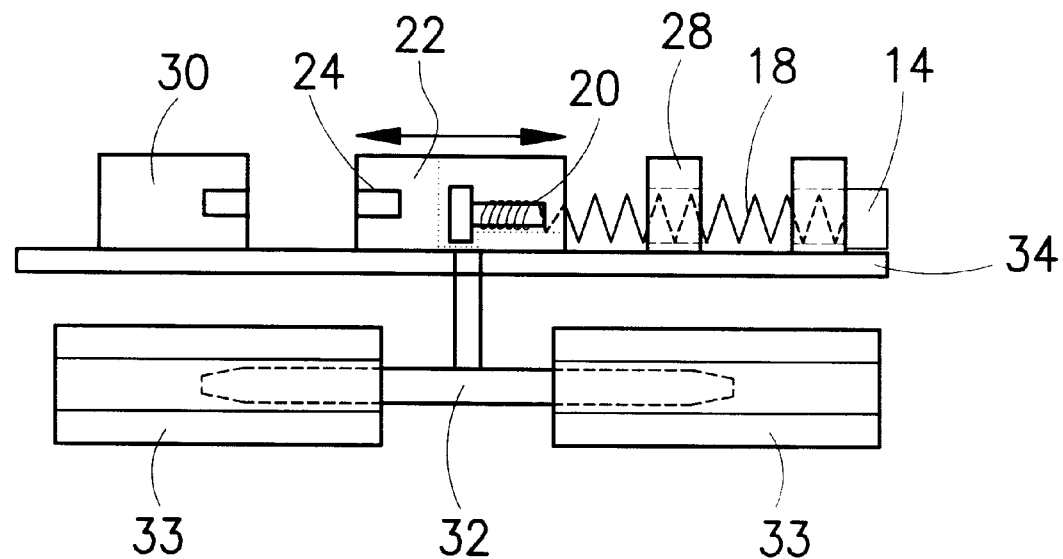
FIG. 5 is a side view of the mobile structure of the optical fiber grating filter according to the preferred embodiment of the present invention.

FIG. 5 is a side view, schematically showing the mobile structure of the optical fiber grating filter according to the present invention. As shown in FIG. 5, the electromagnetic switch includes a plunger 32 and two solenoids 33. A computer controls the movement of the solenoids 33. When the central wavelength of the optical fiber grating 12 needs to be switched, a working voltage is supplied to one of the solenoids 33 through control of the computer. The solenoid can move the plunger 32, which moves the mobile structure from position A to position B. At this moment the spring 18 acts on the bimetal plate 14, so as to change the extent of their bending and the strain capacity, and thus change the central wavelength of the optical fiber grating 12. On the other hand, when the wavelength needs to switch to the previous central wavelength, a working voltage can be supplied, through control of a computer, to the other solenoid 33. This allows the plunder 32 to move from position B back to position A, and at the same time, restore the bimetal plate to their original form. According to the method described above, the central wavelength of an optical fiber grating 12 can be switched between two predetermined values. In the present invention, when the mobile structure 22 is in position A, the position of the mobile structure 22 can be fixed owing to the restoring force of the spring 18. When the mobile structure is switched to position B, there are two small magnets 24, each imbedded in the lower baffle 30 and the mobile structure 22 according to the design of the present invention. The magnets 24 can maintain the mobile structure in position B. When the switch is complete, the electric power can be cut off. Thus long-term power consumption is not necessary.

Figure 6:
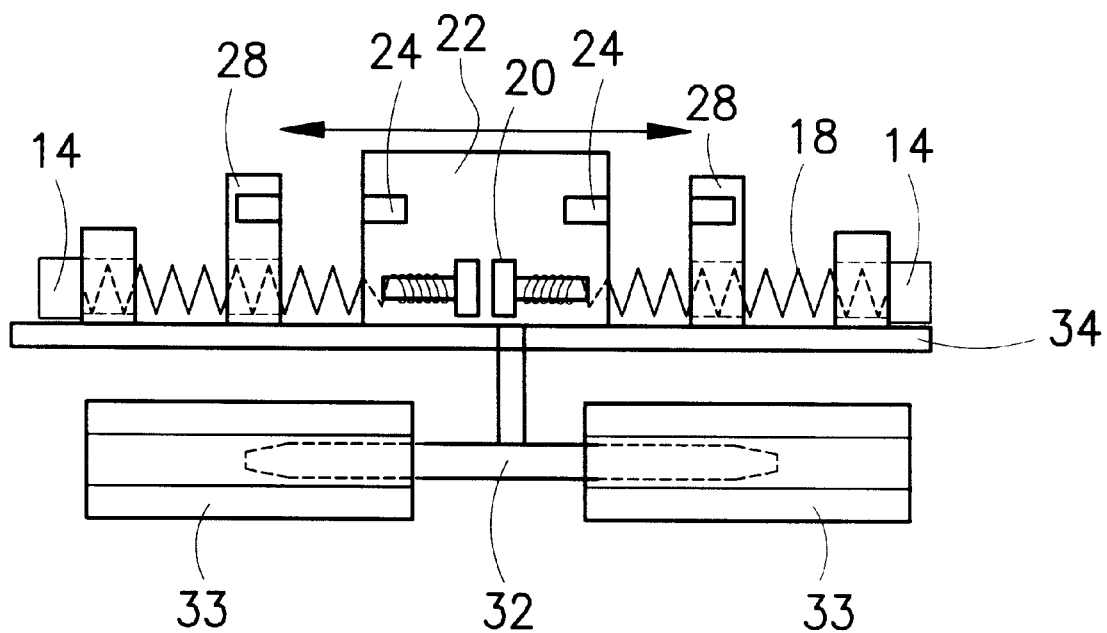
FIG. 6 is a side view of another mobile structure of the optical fiber grating filter according to the preferred embodiment of the present invention.

FIG. 6 is a side view of another mobile structure of an optical fiber grating filter according to the present invention, wherein the same components are marked with the same numerical signs. In FIG. 6, there are two groups of optical fiber grating filters. The magnets are located on top. The central wavelengths of the two groups of optical fiber gratings are controlled at the same time by a single solenoid.

To summarize, one the advantages of the present invention is that it provides an electric optical fiber grating filter for being able to switch central wavelength. The bimetal plate, the spring, and the solenoid are used to adjust the central wavelength of the optical fiber grating and prevent the central wavelength from shifting.

Another advantage of the present invention is that it provides an electric optical fiber grating filter that can switch central wavelengths without need to monitor temperature and control feedback all the time. It therefore does not consume power. Moreover, the invention is also insensitive to temperature.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electric optical fiber grating filter that can switch a central wavelength, the electric optical fiber grating filter at least comprising:

a bimetal plate, which includes a first metal plate and a second metal plate joined together, wherein a thermal expansion coefficient of the first metal plate is smaller than a thermal expansion coefficient of the second metal plate;

an optical fiber having an optical fiber grating, wherein the optical fiber is fixed along a surface of the first metal plate, and the bimetal plate bends when a temperature is changed, so that, a central wavelength of the optical fiber grating can be adjusted for a compensation on a shifting of the central wavelength;

a spring, wherein a first end of the spring is connected to the second metal plate;

a screw, which is connected to a second end of the spring and is used to adjust the number of windings of the spring, so as to optimize the compensation on the shifting of the central wavelength of the optical fiber grating caused by change of the temperature;

a mobile structure, on which the screw is installed; and an electromagnetic switch, which is connected to the mobile structure to switch for stretching the spring to a first position or compressing the spring to a second position, so as to bend the bimetal plate between the two positions with respect to two quantities for the central wavelength.

2. The electric optical fiber grating filter according to claim 1, wherein the electromagnetic switch includes a plunger and two solenoids, where the plunger is connected to the screw.

3. The electric optical fiber grating filter according to claim 1, further comprising a magnet installed on the mobile structure, wherein when the solenoid stretches the mobile structure to the first position, the magnet is used to keep the mobile structure at the first position by its magnetic force.

4. An electric optical fiber grating filter that can switch a central wavelength, comprising at least:

a bimetal plate, which includes a first metal plate and a second metal plate that are joined together, wherein a thermal expansion coefficient of the first metal plate is smaller than a thermal expansion coefficient of the second metal plate;

an optical fiber having an optical fiber grating, wherein the optical fiber is fixed along a surface of the first metal plate, and the bimetal plate bends when a temperature is changed, so that, a central wavelength of the optical fiber grating can be adjusted for a compensation on a shifting of the central wavelength;

an elastic structure, wherein the elastic structure has a first end connected to the second metal plate;

a mobile structure, on which a second end of the elastic structure is installed; and an electromagnetic switch, which is connected to the mobile structure to switch for stretching the elastic structure to a first position or compressing the elastic structure to a second position, so as to bend the bimetal plate between the two positions with respect to two quantities for the central wavelength.

5. The electric optical fiber grating filter according to claim 4, wherein the electromagnetic switch includes a plunger and two solenoids, and the plunger is connected to the second end of the elastic structure.

6. The electric optical fiber grating filter according to claim 4, further including a magnet, wherein the magnet is installed on the mobile structure, and when the solenoid stretches the elastic structure to a position, the magnet is used to keep the elastic structure at the position by its magnetic force.

7. A method of switching a central wavelength of an electric optical fiber grating filter, the optical fiber grating filter including a bimetal plate, an optical fiber having an optical fiber grating and fixed along a surface of the bimetal plate, an elastic structure having a first end connected to the bimetal plate, and an solenoid that is connected to a second end of the elastic structure, the method at least comprising:

using the solenoid to stretch the elastic structure to a first position or compress the elastic structure to a second position, so as to bend the bimetal plate in such a way that they can be used to switch a quantity of the central wavelength of the optical fiber grating.

8. The method of claim 7, wherein the method further comprises using a magnet with its magnetic force to keep the elastic structure at the first position when the solenoid stretches the elastic structure to the first position.

* * * * *